United States Patent
Von Mutius

(10) Patent No.: US 12,104,576 B2
(45) Date of Patent: Oct. 1, 2024

(54) METHOD AND SYSTEM FOR PARAMETERIZATION OF A CONTROLLER FOR A WIND ENERGY INSTALLATION AND/OR OPERATION OF A WIND ENERGY INSTALLATION

(71) Applicant: Siemens Gamesa Renewable Energy Service GmbH, Hamburg (DE)

(72) Inventor: Martin Von Mutius, Borgwedel (DE)

(73) Assignee: Siemens Gamesa Renewable Energy Service GmbH (DE)

( * ) Notice: Subject to any disclaimer, the term of this patent is extended or adjusted under 35 U.S.C. 154(b) by 280 days.

(21) Appl. No.: 17/312,539

(22) PCT Filed: Dec. 9, 2019

(86) PCT No.: PCT/EP2019/084182
§ 371 (c)(1),
(2) Date: Jun. 10, 2021

(87) PCT Pub. No.: WO2020/120380
PCT Pub. Date: Jun. 18, 2020

(65) Prior Publication Data
US 2022/0056882 A1 Feb. 24, 2022

(30) Foreign Application Priority Data
Dec. 10, 2018 (DE) ...................... 10 2018 009 549.6

(51) Int. Cl.
*F03D 7/04* (2006.01)
*F03D 80/40* (2016.01)

(52) U.S. Cl.
CPC ............. *F03D 7/046* (2013.01); *F03D 7/048* (2013.01); *F03D 80/40* (2016.05);
(Continued)

(58) Field of Classification Search
CPC .......... F03D 7/046; F03D 7/048; F03D 80/40; F05B 2260/8211; F05B 2260/84;
(Continued)

(56) References Cited

U.S. PATENT DOCUMENTS 6,324,449 B2 * 11/2001 Albert ..................... B60L 15/20
701/87
8,473,234 B2 * 6/2013 Frederiksen ....... G05B 23/0254
415/119
(Continued)

FOREIGN PATENT DOCUMENTS

DE  102017125457 A1  5/2019
WO  2013110215 A1  8/2013

OTHER PUBLICATIONS

European Patent Office; Search Report in related International Patent Application No. PCT/EP2019/084182 dated Apr. 2, 2020; 7 pages.
(Continued)

*Primary Examiner* — Tulsidas C Patel
*Assistant Examiner* — Thomas K Quigley
(74) *Attorney, Agent, or Firm* — Dorton & Willis, LLP

(57) ABSTRACT

A method of parameterizing a controller of a first wind energy installation wherein the controller sets a manipulated variable of the wind energy installation as a function of an input variable. An artificial intelligence determines at least one value of a parameter of the controller for at least one state/degree of being iced up of the wind energy installation based on a power curve, load, and/or downstream flow of the wind energy installation predicted with a mathematical model of the wind energy installation for at least one state/degree of being iced up, and/or determines at least one value of a parameter of the controller for at least one state/degree of being iced up of the wind energy installation, based on at least one determined state/degree of being iced (Continued)

up and a power, load, and/or downstream flow of the wind energy installation and/or at least one second wind energy installation.

20 Claims, 2 Drawing Sheets

(52) U.S. Cl.
CPC ... *F05B 2260/8211* (2013.01); *F05B 2260/84* (2013.01); *F05B 2270/303* (2013.01); *F05B 2270/323* (2013.01); *F05B 2270/325* (2013.01); *F05B 2270/335* (2013.01); *F05B 2270/404* (2013.01)

(58) Field of Classification Search
CPC .......... F05B 2270/303; F05B 2270/323; F05B 2270/325; F05B 2270/335; F05B 2270/404
See application file for complete search history.

(56) References Cited

U.S. PATENT DOCUMENTS

| | | | | |
|---|---|---|---|---|
| 8,509,956 | B2* | 8/2013 | Jensen | F03D 7/048 700/286 |
| 8,941,253 | B2* | 1/2015 | Christiansen | F03D 80/40 290/44 |
| 9,243,613 | B2* | 1/2016 | Yin | H02J 3/48 |
| 2005/0276696 | A1* | 12/2005 | LeMieux | F03D 80/40 416/61 |
| 2009/0110539 | A1* | 4/2009 | Uphues | F03D 7/026 415/13 |
| 2010/0143120 | A1* | 6/2010 | Kumar | F03D 7/048 416/61 |
| 2012/0226485 | A1* | 9/2012 | Creagh | F03D 80/40 703/7 |
| 2014/0265329 | A1* | 9/2014 | Jensen | F03D 7/028 290/44 |
| 2015/0118047 | A1 | 4/2015 | Yoon | |
| 2016/0226258 | A1* | 8/2016 | Giertz | H02J 3/381 |
| 2018/0136617 | A1 | 5/2018 | Xu et al. | |
| 2018/0347545 | A1* | 12/2018 | Demuth | F03D 7/047 |
| 2020/0217300 | A1* | 7/2020 | Stähler | F03D 17/00 |
| 2020/0386206 | A1 | 12/2020 | Schauss et al. | |

OTHER PUBLICATIONS

European Patent Office; Search Report in related International Patent Application No. PCT/EP2019/084182 dated Apr. 2, 2020; 10 pages.
German Patent Office; Search Report in related German Patent Application No. 10 2018 009 549.6 dated Nov. 11, 2019; 7 pages.
Chen Longting et al, "Learning Deep Representation for Blades Icing Fault Detection of Wind Turbines", 2018 IEEE International Conference on Prognostics and Health Management (ICPHM), IEEE, (Jun. 11, 2018), doi:10.1109/ICPHM.2018.8448394, pp. 1-8, XP033395825.
European Patent Office; Office Action in related International Patent Application No. PCT/EP2019/084182 dated Feb. 7, 2024; 6 pages.
Chinese Patent Office; Office Action in related Chinese Patent Application No. 201980081586.X dated Feb. 2, 2024; 6 pages.

* cited by examiner

METHOD AND SYSTEM FOR PARAMETERIZATION OF A CONTROLLER FOR A WIND ENERGY INSTALLATION AND/OR OPERATION OF A WIND ENERGY INSTALLATION

CROSS-REFERENCE TO RELATED APPLICATIONS

This application is a national phase application under 35 U.S.C. § 371 of International Patent Application No. PCT/EP2019/084182, filed Dec. 9, 2019 (pending), which claims the benefit of priority to German Patent Application No. DE 10 2018 009 549.6, filed Dec. 10, 2018, the disclosures of which are incorporated by reference herein in their entirety.

TECHNICAL FIELD

The present invention relates to a method of parameterizing a controller of a wind energy installation, in particular to a method of parameterizing a controller of a wind energy installation in a multi-stage and/or adaptive manner, to a method of operating the wind energy installation, wherein the controller is parameterized by means of this method, as well as a system and/or a computer program product for carrying out such a method.

BACKGROUND

Wind energy installations are meant to convert wind energy into electrical power as optimally as possible. For this purpose, according to internal practice within the present applicant company, control variables such as, in particular, blade pitch angles and generator (braking) torques, have so far been set, by the controllers of the wind energy installations, as a function of input variables such as, in particular, the wind speed.

If rotor blades of wind energy installations ice up, not only do their weight and/or moment of inertia change, but also in particular their aerodynamics, so that they usually generate less mechanical power, which, in particular, can lead to power losses if—compared to the non iced-up constructional state—the blade pitch angle and the generator (braking) torque remain unchanged.

SUMMARY

It is an object of the present invention to improve the parameterizing and/or the operation of wind energy installations.

This object is solved by a method as described herein, and by a system or a computer program product for carrying out at least one of the methods described herein.

According to one embodiment of the present invention, a controller of at least one wind energy installation, which, without loss of generality, is referred to herein as a first wind energy installation, is parameterized for one or more different states/degrees of being iced up, of the wind energy installation (in each case specific to the state/degree of being iced up), i.e. in particular re-parameterized with respect to a non iced-up or ice-free (constructional) state (in each case specific to the state/degree of being iced up).

By means of this, in one embodiment, a change in mass (or a change in the distribution of mass) and/or a change in aerodynamics, caused by icing-up, can be taken into account, and, thereby, in an advantageous manner, a power output of the wind energy installation can be improved and/or a load on the wind energy installation can be reduced.

During operation, the controller sets a one dimensional or multi-dimensional manipulated variable of the wind energy installation, in particular for one or more actuators of the wind energy installation, as a function of a one dimensional or multi-dimensional input variable, in particular an at least partially measured input variable, or is set up for this purpose or is used for this purpose. In particular, it can comprise several individual controllers, in particular for the adjustment of individual blade pitch angles ("Individual Pitch Control" IPC).

The input variable can in particular be dependent upon a wind speed, in particular its direction and/or its absolute value, in one embodiment it can specify the wind speed, in particular its direction and/or its absolute value, and in particular it can be the wind speed, in particular its direction and/or its absolute value. In addition or as an alternative, in one embodiment, the input variable can be dependent on a rotational speed and/or an electrical and/or a mechanical power of the wind energy installation, in one embodiment it can specify a rotational speed and/or an electrical and/or a mechanical power of the wind energy installation, and in particular it can be a rotational speed and/or an electrical and/or a mechanical power of the wind energy installation.

These physical quantities can easily be measured and have a great influence on the function of a wind energy installation, they are therefore particularly advantageous for the feed-back control of wind energy installations.

In one embodiment, a pitch angle ("pitch") of one or more blades of a rotor of the wind energy installation, in particular a blade pitch angle, as it is referred to, about a longitudinal axis of the (respective) blade, is set or adjusted in dependence upon the manipulated variable, and in a further development, the pitch angles of a plurality of blades are set or adjusted individually or collectively in dependence upon the manipulated variable.

In addition or as an alternative, in one embodiment, a wind tracking feature of the rotor of the wind energy installation is set or adjusted in dependence upon the manipulated variable, and in a further development, a rotation of the rotor about a vertical or longitudinal axis of a tower on which the rotor is rotatably mounted is set or adjusted in dependence upon the manipulated variable.

In addition or as an alternative, in one embodiment, a braking torque of a generator of the wind energy installation is set or adjusted in dependence upon the manipulated variable, which generator is coupled to the rotor, in one embodiment via a transmission.

In addition or as an alternative, in one embodiment, a heating of one or more blades of a rotor of the wind energy installation is adjusted in dependence upon the manipulated variable, in particular activated or deactivated. In this way, the operation of the wind energy installation can be controlled particularly effectively and/or reliably in each case, in particular in combination of two or more of the embodiments mentioned above.

According to one embodiment of the present invention, the controller is parameterized on the basis of at least one parameter value or is parameterized with at least one parameter value which a (first) artificial intelligence determines, or which a (first) artificial intelligence has determined, for the (respective) state/degree of being iced up of the wind energy installation, in particular for the current, or currently determined, (respective) state/degree of being iced up of the wind energy installation, or, (in each case) specific to the state/degree of being iced up, on the basis of a power, load and/or downstream flow, which is/are predicted with (the aid of) a mathematical model of the first wind energy installation for one or more states/degrees of being iced up, in particular for this state/degree of being iced up, if this state/degree of being iced up is determined. In a further development, the artificial intelligence parameterizes the controller, and in another further development, it merely provides a parameter value that is advantageous for this purpose, which a user can, for example, selectively adopt in whole or in part. While automatic parameterization by the artificial intelligence can increase the efficiency and/or reliability in an advantageous manner, a determination of a parameter value which is subsequently adopted, in particular selectively, can enable a plausibility check and can thus increase safety in an advantageous manner.

In addition or as an alternative, according to one embodiment of the present invention, the controller is parameterized on the basis of at least one parameter value, or with at least one parameter value, and in a further development it is re-parameterized on the basis of at least one parameter value, or with at least one parameter value, which the same or a further artificial intelligence determines, or has determined, for the (respective) state/degree of being iced up, in particular for the (respective) current, or currently determined, state/degree of being iced up, of the wind energy installation or, (in each case) specific to the state/degree of being iced up, determined on the basis of one or more states/degrees of being iced up of the wind energy installation, in particular determined, in the past, on the basis of one or more states/degrees of being iced up of the wind energy installation, and a power, load and/or downstream flow of the first wind energy installation and/or of one or more second wind energy installation(s), in one embodiment of one or more (respective) second wind energy installation(s) of the same type, (respectively) determined for this purpose, in particular by means of a measurement or measurements, if this state/degree of being iced up is determined. In a further development, this artificial intelligence parameterizes the controller, in another further embodiment it merely provides a parameter value that is advantageous for this purpose.

By means of this, in one embodiment, the parameterization of the controller can be adapted, in an advantageous manner, to a state/degree of being iced up, in one embodiment to one of a plurality of states/degrees of being iced up, of the wind energy installation, and thereby the operation of the first wind energy installation can be improved.

In one embodiment, the controller can be adapted to the respective state/degree of being iced up in a particularly precise manner by the power, load and/or downstream flow of the wind energy installation having itself been predicted, in one embodiment, for this state/degree of being iced up, on the basis of a model, for the determination of the (parameter) value for a state/degree of being iced up. Similarly, in one embodiment, the (parameter) value for a state/degree of being iced up can be determined on the basis of other states/degrees of being iced up for which the power, load and/or downstream flow of the wind energy installation has been predicted, in each case on the basis of a model, in particular by interpolation and/or extrapolation or the like. By means of this, in one embodiment, a larger number of different states/degrees of being iced up can be covered. By the fact that, in one embodiment, for the determination of the (parameter) value for a state/degree of being iced up the power, load and/or downstream flow of the wind energy installation has been determined for this state/degree of being iced up itself, the controller can, in one embodiment, be adapted to the respective state/degree of being iced up in a particularly precise manner. Similarly, in one embodiment, the (parameter) value for one state/degree of being iced up can be determined on the basis of other states/degrees of being iced up for which the respective power, load and/or downstream flow of the wind energy installation has been determined, in particular by interpolation and/or extrapolation or the like. By means of this, in one embodiment, a larger number of different states/degrees of being iced up can be covered.

In one embodiment, a state/degree of being iced up is dependent on an ice load or a mass of ice adhering to one or more rotor blades of the wind energy installation, in particular the amount and/or the distribution thereof, and may in particular indicate or define the same. In particular, a first state/degree of being iced up may exist if a first rotor blade has a first ice load and a second rotor blade has a second ice load, and a second state/degree of being iced up, which is different therefrom, may exist if, conversely, the first rotor blade has the second ice load and the second rotor blade has the first ice load. In this case, in one embodiment, the controller can be parameterized differently for this first and second state/degree of being iced up, or a different (parameter) value can be determined so that the controller adjusts the two rotor blades individually, in each case in accordance with their ice load. In this context, the corresponding components of the (parameter) value can in particular be interchanged so that the controller adjusts rotor blades which are equally iced up, equally, or so that the controller adjusts rotor blades (individually) in dependence upon their (individual) state/degree of being iced up which has been determined.

In one embodiment, the (respective) artificial intelligence determines the (respective) (parameter) value in such a way that a power output of the wind energy installation is optimized, in one embodiment taking into account a load, in particular a maximum permissible load and/or an average load, in particular of its rotor blades, and/or a downstream flow, in particular whilst avoiding a stall, or in order to avoid a stall. Accordingly, in one embodiment the (parameter) value is determined in such a way, and/or (also) with the requirement that a stall is avoided.

Accordingly, in one embodiment, a process of at least two stages is carried out, wherein:
- in one stage, at least one parameter value, in particular as an initial value, is determined for at least one state/degree of being iced up of the wind energy installation, by means of a mathematical model of the wind energy installation; and
- in one stage, in one embodiment in a subsequent stage, a (new) parameter value is determined for (each of) at least one state/degree of being iced up of the wind energy installation, in particular for this state/degree of being iced up of the wind energy installation, by means of the first wind energy installation, in particular on the basis of the initial value determined by means of the mathematical model.

In addition or as an alternative, in one embodiment, one or more second wind energy installations, in particular one or more second wind energy installations of the same type, can be used for referencing, in particular in that the artificial intelligence also takes into account, and in particular uses, corresponding powers, loads, downstream flows and/or (parameter) values, (or powers, loads, downstream flows and/or (parameter) values determined in a corresponding manner) for one or more determined states/degrees of being iced up of this second wind energy installation or these second wind energy installations. In this way, a kind of swarm intelligence can be used in an advantageous manner.

Through the carrying out of a determination by means of the mathematical model, in one embodiment, a particularly wide range of possible parameter components and/or parameter values (or parameter value ranges) and/or possible ambient conditions can be examined in advance. In addition or as an alternative, in this context, it is possible for influences of environmental conditions to be taken into account in a (more) precise manner, in particular free of measurement errors or the like. Parameter values which are based on a model (or parameter values which are determined on the basis of a model) can be used as initial values in a particularly advantageous manner when (new) parameter values are being determined on the basis of actual wind energy installations.

Through the carrying out of a determination by means of the actual first wind energy installation, in one embodiment, its individual or concrete environmental conditions can be detected and thus their influences can be better taken into account, in particular starting from a mathematical model or a prototype second wind energy installation.

Through the carrying out of a determination by means of the first wind energy installation as well as one or more further, second wind energy installations, in particular one or more further, second wind energy installations of the same type, in one embodiment, stochastic fluctuations in the ambient conditions can be compensated for in an advantageous manner, and/or a type of swarm intelligence can be used.

In one embodiment, the (first and/or further) artificial intelligence determines one or more parameter values in situ during operation, in one embodiment during normal operation, on the basis of at least one power, load and/or downstream flow of the first wind energy installation determined in the process by means of measurement, wherein the controller is re-parameterized and/or updated on the basis of this parameter value, in one embodiment by the artificial intelligence. In this way, the controller can be adaptively adjusted and thus the operation of the wind energy installation can be improved (further).

In one embodiment, the parameter is (pre-)selected from a set of possible parameters of the controller, for example empirically on the basis of previous parameterizations specific to the state/degree of being iced up of wind energy installations or the like, in particular of wind energy installations or the like of a different type.

In addition or as an alternative, in one embodiment, the (first and/or further) artificial intelligence is (respectively) given an adjustable starting value for the parameter value, or one of several possible starting values, in particular permissible starting values, is specified or set, starting from which the (first and/or further) artificial intelligence determines the parameter value.

In addition or as an alternative, in one embodiment, the (first and/or further) artificial intelligence is (respectively) given a permissible range of values of the parameter, in particular a permissible range of values of one or more components of the parameter, within which it may determine or vary the parameter value.

In addition or as an alternative, the (first and/or further) artificial intelligence (respectively) determines a sensitivity, with respect to various components of the parameter, of the power, the load and/or the downstream flow, and in particular of a stall. Then, in one embodiment, one or more components of the parameter with respect to which a power, a load and/or a downstream flow is sensitive (or more sensitive) can be selected, in particular by the (respective) artificial intelligence, and, in a subsequent stage, the (respective) artificial intelligence can determine or vary values only for these components. In particular, in this way, sensitive components (or more sensitive components) can be selected by means of the mathematical model, and it is possible for only these components to be determined, in particular adjusted, on the basis of at least one power, load and/or downstream flow, determined by means of measurement, of the first wind energy installation and/or at least one second wind energy installation, in particular a second wind energy installation of the same type.

By means of this, the parameter value can be optimized by the artificial intelligence particularly effectively in each case, in particular in combination of two or more of the embodiments mentioned above.

In one embodiment, at least one state/degree of being iced up for which a power, load and/or downstream flow of a wind energy installation is determined, on the basis of which the artificial intelligence determines the (respective) value or parameter value (i.e. a "learning state/degree of being iced up"), and/or a state/degree of being iced up for which the controller is parameterized if this is determined (i.e. an actual state/degree of being iced up, or a state/degree of being iced up to be controlled), is determined, in each case, for a time interval of at most 5 minutes and/or at least 10 seconds.

This is based in particular on the recognition that states/degrees of being iced up of wind energy installations can change so significantly and in such a short time frame that this can require a re-parameterization, which is surprising in particular in comparison to the longer periods (of observation) that are usually used as a basis for the control or parameterization and that, as a rule, lie in the range of at least 10 minutes, in order to average out in particular stochastic fluctuations and the like.

In addition or as an alternative, in one embodiment, at least one state/degree of being iced up for which a power, a load and/or a downstream flow of a wind energy installation is determined, on the basis of which the artificial intelligence determines the (respective) value or parameter value (i.e. a "learning state/degree of being iced up"), and/or a state/degree of being iced up for which the controller is parameterized if this is determined (i.e. a current state/degree of being iced up, or a state/degree of being iced up to be controlled), is determined in each case with the aid of one or more wind measuring devices, in one embodiment with the aid of one or more wind energy installation-side wind measuring devices or with the aid of one or more wind measuring devices which are fixed with respect to the wind energy installation, and/or one or more sensors, which, in one embodiment, are arranged on one or more rotor blades, in particular in one or more rotor blades, and/or on the basis of a determined power of the (respective) wind energy installation and/or at least one determined temperature and/or humidity.

In this context, in one embodiment, a state/degree of being iced up can be determined on the basis of a comparison of wind measurements with at least one heated wind measuring device and at least one unheated wind measuring device. This is based in particular on the idea that an unheated wind measuring device, in particular an unheated wind energy installation-side wind measuring device, has a state/degree of being iced up which corresponds to a state/degree of being iced up of one or more rotor blades and that the state/degree of being iced up of the wind energy installation can be estimated in a simple manner by comparison with a heated wind measuring device and thus with a wind measuring device which is reliably not iced up.

In addition or as an alternative, in one embodiment, a state/degree of being iced up can be determined on the basis of one or more temperature sensors and/or load sensors on one or more rotor blades of the wind energy installation, in particular in one or more rotor blades of the wind energy installation. This is based in particular on the idea that icing-up of one or more rotor blades is dependent upon their temperature and/or changes their load, so that the state/degree of being iced up of the wind energy installation, in particular of individual rotor blades, can be determined reliably or more reliably.

In addition or as an alternative, in one embodiment, a state/degree of being iced up can be determined on the basis of a determined power, in particular on the basis of a determined mechanical and/or electrical power, of the (respective) wind energy installation. This is based in particular on the idea that icing-up of the wind energy installation reduces its output power, so that the state/degree of being iced up of the wind energy installation can be determined in a simple manner, preferably without additional equipment.

In addition or as an alternative, in one embodiment, a state/degree of being iced up can be determined on the basis of a temperature and/or humidity which has been determined, in one embodiment on the basis of a temperature and/or humidity which has been determined at the wind energy installation. This is based in particular on the idea that icing-up of the wind energy installation may depend on the meteorological ambient conditions, so that the state/degree of being iced up of the wind energy installation can be determined, in particular predicted, in a simple manner. Accordingly, in the present context, a determination can generally comprise a determination, in particular an estimation, of a currently present state/degree of being iced up or a prediction or an estimation of a future state/degree of being iced up (or of a state/degree of being iced up which is assumed to be present in the future), and it can in particular be a determination, in particular an estimation, of a currently present state/degree of being iced up or a prediction or an estimation of a future state/degree of being iced up (or of a state/degree of being iced up which is assumed to be present in the future).

In one embodiment, the (first and/or further) artificial intelligence determines the parameter value (in each case) with the aid of machine learning, in particular with the aid of reinforcement learning ("Reinforced Learning" RL). This represents a form of artificial intelligence which is particularly advantageous for the present application, in particular one which is efficient and/or reliable, wherein, in one embodiment, the artificial intelligence advantageously combines dynamic programming and parameterized function approximators, in particular neural networks.

According to one embodiment of the present invention, a system is set up, in particular in terms of hardware and/or software, in particular in terms of programming, for carrying out a method described herein, and/or comprises:
  an artificial intelligence for determining, in particular for adjusting, at least one value of a parameter of the controller for at least one state/degree of being iced up of the wind energy installation, on the basis of a power, load and/or downstream flow of the wind energy installation predicted with a mathematical model of this wind energy installation for at least one state/degree of being iced up, in particular this state/degree of being iced up; and/or
  an artificial intelligence, in particular the same artificial intelligence or a different one, for determining, in particular for adjusting, at least one value of a parameter of the controller for at least one state/degree of being iced up of the wind energy installation, on the basis of at least one determined state/degree of being iced up of the wind energy installation, in particular this determined state/degree of being iced up of the wind energy installation, and a power, load and/or downstream flow of this wind energy installation and/or of at least one second wind energy installation, in particular of at least one second wind energy installation of the same type, determined for this purpose by means of measurement; and/or
  the controller which is parameterized by means of a method described herein.

In one embodiment, the system, or its means, comprises:
  means for setting a pitch angle of at least one blade and/or a heating of a rotor of the first wind energy installation, for setting a wind tracking feature of the rotor and/or for setting a braking torque of a generator of the first wind energy installation in dependence upon the manipulated variable;
  means for selecting the parameter from a set of possible parameters of the controller;
  means for specifying an adjustable starting value and/or an allowable range of values of the parameter to the artificial intelligence;
  means for determining a sensitivity, with respect to various components of the parameter, of the power, the load and/or the downstream flow, by means of the artificial intelligence;
  means for determining a state/degree of being iced up, with the aid of at least one wind measuring device, in particular with the aid of at least one wind energy installation-side wind measuring device, and/or with the aid of at least one sensor, in particular with the aid of at least one sensor which is arranged on a rotor blade, and/or on the basis of a determined power of the wind energy installation and/or at least one determined temperature and/or humidity; and/or
  means for determining the parameter value by the artificial intelligence with the aid of machine learning, in particular with the aid of reinforcement learning.

A means in the sense of the present invention can be constructed in terms of hardware and/or software, and may comprise in particular a processing unit, in particular a microprocessor unit (CPU) or a graphics card (GPU), in particular a digital processing unit, in particular a digital microprocessor unit (CPU), a digital graphics card (GPU) or the like, preferably connected to a memory system and/or a bus system in terms of data or signal communication, and/or may comprise one or more programs or program modules. The processing unit may be constructed so as to process instructions which are implemented as a program stored in a memory system, to acquire input signals from a data bus, and/or to output output signals to a data bus. A memory system may comprise one or more storage media, in particular different storage media, in particular optical media, magnetic media, solid state media and/or other non-volatile media. The program may be of such nature that it embodies the methods described herein, or is capable of executing them, such that the processing unit can execute the steps of such methods and thereby in particular operate the first wind energy installation and/or parameterize its controller and/or determine at least one parameter value for this purpose. In one embodiment, a computer program product may comprise a storage medium, in particular a non-volatile storage medium, for storing a program or having a program stored thereon, and may in particular be such a storage medium, wherein execution of said program causes a system or a control system, in particular a computer, to carry out a method described herein, or one or more of its steps.

In one embodiment, one or more steps of the method, in particular all steps of the method, are carried out in a fully or partially automated manner, in particular by the system or its means.

In one embodiment, the system comprises the first and/or at least one second wind energy installation.

Further advantages and features will become apparent from the dependent claims and the example embodiments.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
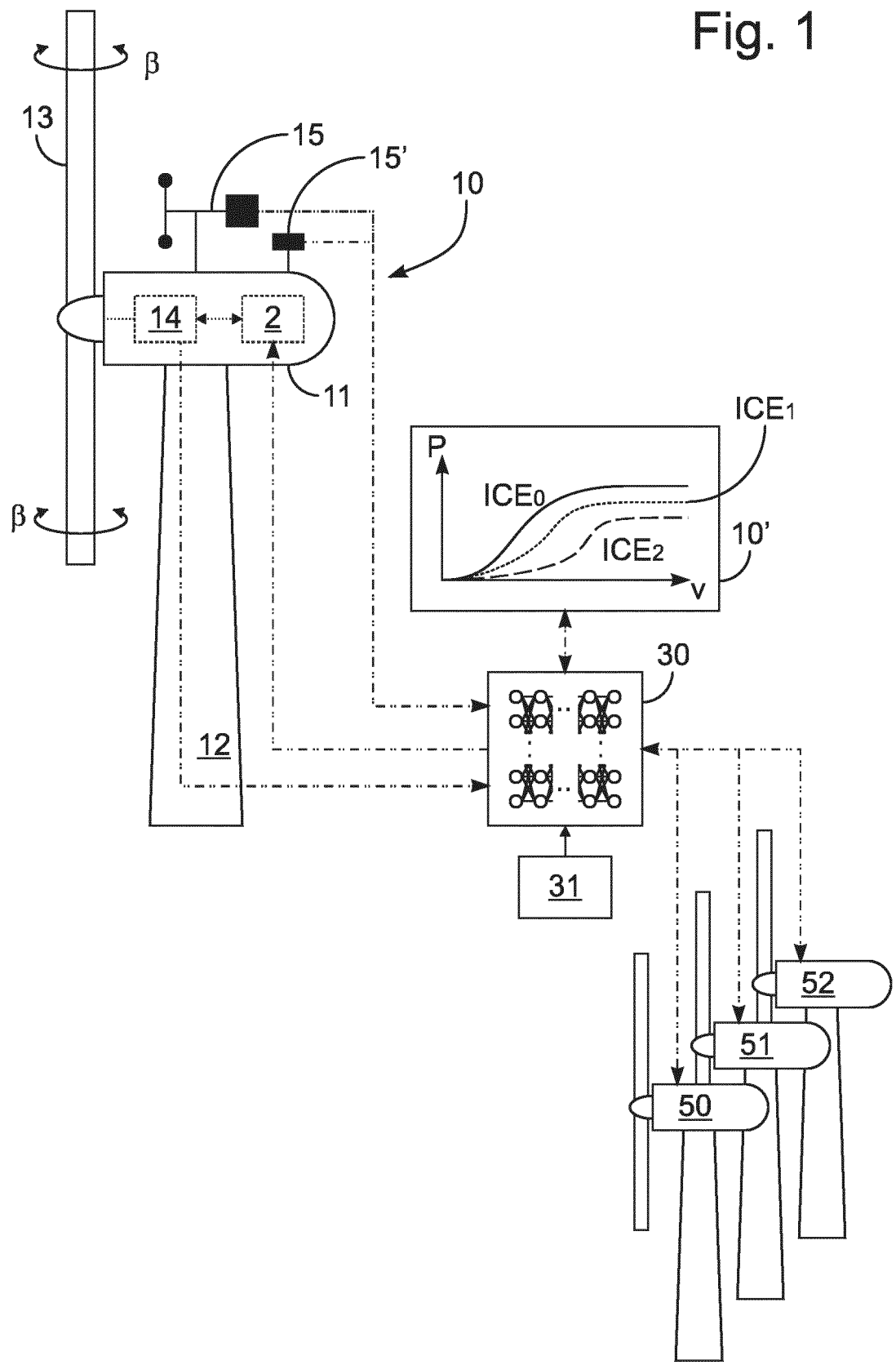
FIG. 1 shows a system for operating a first wind energy installation 10 and/or for parameterizing a controller of this wind energy installation in accordance with an embodiment of the present invention.
Figure 2:
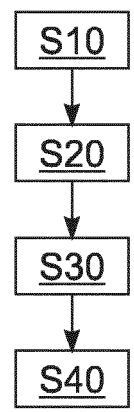
FIG. 2 shows a method of operating the first wind energy installation or of parameterizing the controller in accordance with an embodiment of the present invention.

FIG. 1 shows a system for operating a first wind energy installation 10 and/or for parameterizing a controller 2 of this wind energy installation in accordance with an embodiment of the present invention, and FIG. 2 shows a corresponding method.

In a manner known per se, the first wind energy installation comprises a nacelle 11, which is mounted on a tower 12 so as to be rotatable and which comprises a rotor with adjustable blades 13, which rotor is coupled to a generator 14.

The controller 2 of the wind energy installation adjusts, on the basis of a measured generator power and/or a wind speed measured by means of two wind measuring devices 15, 15' which are fixed with respect to the wind energy installation, a braking torque of the generator, a wind tracking feature of the nacelle about a yaw axis which, in FIG. 1, is vertical, and/or collectively or individually pitch angles β of the rotor blades, for example by means of a threshold control and/or a proportional control, an integral control and/or a differential control, in one embodiment a cascaded threshold control and/or a cascaded proportional control, a cascaded integral control and/or a cascaded differential control, or a different type of control.

For this purpose, according to one embodiment of the present invention, the controller is parameterized depending on the determined state/degree of being iced up of the wind energy installation, and/or specific to the state/degree of being iced up, for example, for different degrees of being iced up $ICE_0$, $ICE_1$ and $ICE_2$, in each case, different (parameter) values for amplification coefficients, threshold values or the like are set in a manner which is specific to the degree of being iced up.

For this purpose, in a first step S10 (cf. FIG. 2), an artificial intelligence 30, in the example embodiment a computer with software for reinforced (machine) learning, is given initial values and/or permissible value ranges for the components of the multi-dimensional parameter by means of an interface 31, for example an input menu or the like.

In a second step S20, it is determined by means of the artificial intelligence and with the aid of a mathematical model 10 of the wind energy installation, which mathematical model 10, for parameter values of the co-modeled controller specified by the artificial intelligence, specified virtual wind speed values v and specified virtual states/degrees of being iced up, simulates or predicts a respective generated electrical power P of the modeled wind energy installation, how strong, within their permissible value range, the influence of the various components of the parameter, i.e. for example individual amplification coefficients or the like, is on the power. In step S20, the artificial intelligence then determines (in each case) a (multi-dimensional parameter) value that optimizes the power for the respective state/degree of being iced up. In this process, a load on the wind energy installation, in particular on its rotor blades 13, and/or an avoidance of a stall, can also be taken into account.

In a third step S30, the controller of the first wind energy installation 10 and controllers of further, second wind energy installations 50-52 of the same type are parameterized with the (parameter) values found in this way.

In a fourth step S40, the controllers of these wind energy installations 10, 50-52 are further re-parameterized during operation in a manner analogous to the step S20 described above, with the aid of the same or one or more further artificial intelligences, in the example embodiment with the aid of the computer or one or more further computers with software for reinforced (machine) learning.

In this context, for optimizing the controller of the first wind energy installation 10, the artificial intelligence uses data from the second wind energy installations 50-52 as a reference, so that a kind of swarm intelligence can be used in an advantageous manner.

During operation of the wind energy installations 10, 50-52, their respective current state/degree of being iced up is determined for a short time interval of about 0.5 to 2 minutes by means of a comparison of the wind speeds measured by the unheated cup anemometer 15 and those measured by the heated ultrasonic anemometer 15'.

On the basis of the state/degree of being iced up determined in this way, in step S40, the controller is then re-parameterized, specific to the state/degree of being iced up, with the (parameter) value (so far) determined for this purpose, or a respective (parameter) value determined for this state/degree of being iced up of the wind energy installation is set if this state/degree of being iced up is determined. Accordingly, at the same time, an in situ control is carried out with the (parameter) value specific to the state/degree of being iced up determined so far, and, at the same time, this is (further) optimized on the basis of the power determined in the process.

If, in a variant—for example by means of temperature sensors and/or load sensors in the individual rotor blades—their individual ice load is determined, components of the (parameter) value which determine the individual blade pitch angles of the rotor blades can be individually adapted to the respective state/degree of being iced up of the rotor blades and, purely by way of example, a more heavily iced-up blade can be pitched more strongly in partial load operation in order to take account of its deteriorated aerodynamics and, in particular, in order to avoid a stall.

Figure 3:
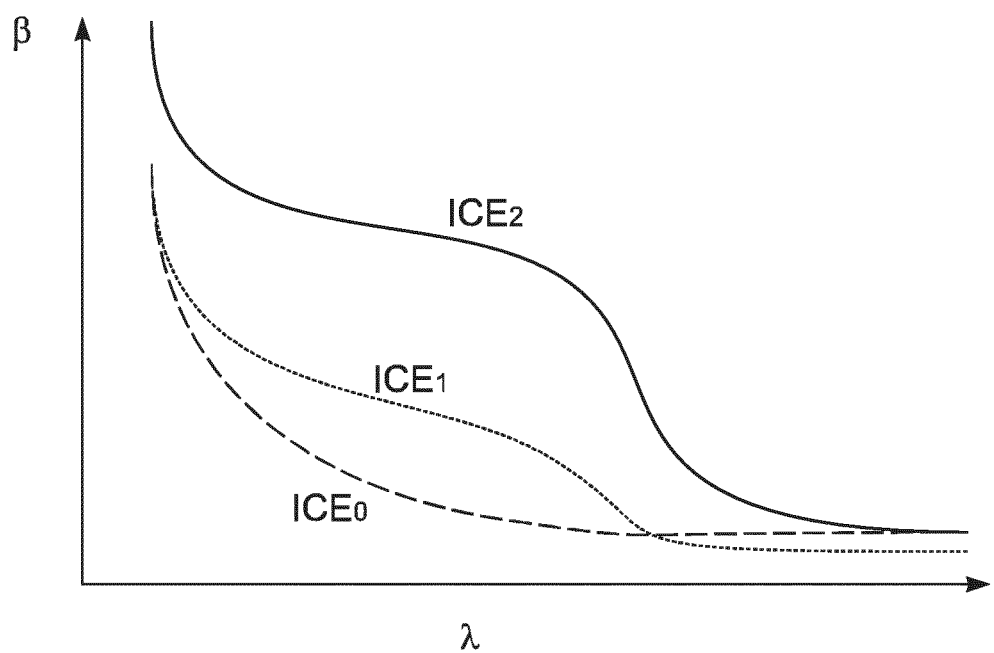
FIG. 3 shows characteristic curves of the controller for different states/degrees of being iced up, as determined by an artificial intelligence.

FIG. 3 shows, for illustration purposes, characteristic curves of the controller 2 for different states/degrees of being iced up $ICE_0$, $ICE_1$ and $ICE_2$, respectively, which characteristic curves are determined by the artificial intelligence by means of reinforced learning, whereby the degree of being iced up increases from $ICE_0$ to $ICE_1$ and from $ICE_1$ to $ICE_2$, respectively. The (parameter) values which are specific to the state/degree of being iced up and which are determined for these states/degrees of being iced up determine the shape and the position of the characteristic curves, by means of which the controller individually sets the blade angles β of the rotor blades as a function of the tip-speed ratio λ and thus as a function of the rotational speed and the wind speed.

Although example embodiments have been explained in the preceding description, it is to be noted that a variety of variations are possible.

It is also to be noted that the example embodiments are merely examples which are not intended to limit the scope of protection, the applications and the structure in any way. Rather, the preceding description provides the person skilled in the art with a guideline for the implementation of at least one example embodiment, whereby various modifications, in particular with regard to the function and the arrangement of the components described, can be made without departing from the scope of protection as it results from the claims and combinations of features equivalent to these.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS 10 first wind energy installation
10' model
11 nacelle
12 tower
13 rotor (blade)
14 generator
15; 15' wind measuring device
2 controller
30 computer with software for reinforced learning (AI)
31 interface
50, 51, 52 second wind energy installation
P electric power
v averaged wind speed
β blade pitch angle
λ tip-speed ratio

What is claimed is:

1. A method of parameterizing a controller of a first wind energy installation, wherein the controller is configured to set a manipulated variable of the first wind energy installation based on an input variable, the method comprising:
determining with an artificial intelligence at least one value of a parameter of the controller for at least one state/degree of the first wind energy installation being iced up, on the basis of at least one determined state/degree of the first wind energy installation being iced up, and at least one of:
a power of at least one second wind energy installation, which power is determined for at least one determined state/degree of the at least one second wind energy installation being iced up,
a load of at least one second wind energy installation, which load is determined for the at least one determined state/degree of the at least one second wind energy installation being iced up, or
a downstream flow of at least one second wind energy installation, which downstream flow is determined for the at least one determined state/degree of the at least one second wind energy installation being iced up;
wherein the artificial intelligence determines the at least one value of a parameter of the controller such that a power output of the wind energy installation is maximized.

2. The method of claim 1, wherein at least one of:
the method is performed in at least one of a multi-stage or adaptive manner;
determining the at least one value of a parameter with artificial intelligence comprises adapting or adjusting the at least one value with the artificial intelligence;
the at least one determined state/degree of being iced up is the same state/degree of being iced up for which the at least one value of the parameter is being determined;
the at least one second wind energy installation is a wind energy installation of the same type as the first wind energy installation;
the at least one of a power, a load, or a downstream flow is determined by a measurement.

3. The method of claim 1, wherein the state/degree of being iced up is at least one of:
determined for a time interval of at most 5 minutes;
determined with the aid of at least one of:
at least one wind measuring device, or
at least one sensor; or
determined on the basis of at least one of a determined power of the wind energy installation, at least one determined temperature, or at least one determined humidity.

4. The method of claim 3, wherein at least one of:
the at least one wind measuring device comprises at least one wind energy installation-side wind measuring device; or
the at least one sensor comprises at least one sensor arranged on a rotor blade.

5. The method of claim 1, wherein at least one of:
the input variable is dependent upon at least one of a wind speed, a rotational speed, an electrical power, or a mechanical power of the wind energy installation; or
at least one of a pitch angle, a heating of at least one blade of a rotor of the first wind energy installation, a wind tracking feature of the rotor, or a braking torque of a generator of the first wind energy installation is set based on the manipulated variable.

6. The method of claim 1, wherein at least one of:
the parameter is selected from a set of possible parameters of the controller;
at least one of an adjustable starting value or a permissible range of values of the parameter is specified to the artificial intelligence; or the artificial intelligence determines a sensitivity, with respect to various components of the parameter, of at least one of the power, the load or the downstream flow.

7. The method of claim 1, wherein the artificial intelligence determines the parameter value with the aid of machine learning.

8. The method of claim 7, wherein the machine learning comprises reinforcement learning.

9. A method of operating a wind energy installation, the method comprising:
adjusting the manipulated variable of the wind energy installation with a controller based on the input variable in response to a state/degree of being iced up being determined;
wherein the controller has been parameterized according to the method of claim 1 for the state/degree of the wind energy installation being iced up.

10. The method of claim 9, wherein the state/degree of being iced up is at least one of:
determined for a time interval of at most 5 minutes;
determined with the aid of at least one of:
at least one wind measuring device, or
at least one sensor; or
determined on the basis of at least one of a determined power of the wind energy installation, at least one determined temperature, or at least one determined humidity.

11. The method of claim 10, wherein at least one of:
the at least one wind measuring device comprises at least one wind energy installation-side wind measuring device; or
the at least one sensor comprises at least one sensor arranged on a rotor blade.

12. A system for parameterizing a controller of a first wind energy installation, wherein the controller is configured to set a manipulated variable of the first wind energy installation as a function of an input variable, the system comprising:
an artificial intelligence configured to determine at least one value of a parameter of the controller for at least one state/degree of the first wind energy installation being iced up, on the basis of at least one determined state/degree of the first wind energy installation being iced up, and at least one of:
a power of at least one second wind energy installation, which power is determined for at least one determined state/degree of the at least one second wind energy installation being iced up,
a load of at least one second wind energy installation, which load is determined for the at least one determined state/degree of the at least one second wind energy installation being iced up, or
a downstream flow of at least one second wind energy installation, which downstream flow is determined for the at least one determined state/degree of the at least one second wind energy installation being iced up;
wherein the artificial intelligence determines the at least one value of a parameter of the controller such that a power output of the wind energy installation is maximized.

13. The system of claim 12, further comprising the controller that is being parameterized.

14. A computer program product for parameterizing a controller of a first wind energy installation, wherein the controller is configured to set a manipulated variable of the first wind energy installation as a function of an input variable, the computer program product comprising program code stored in a non-transitory, machine-readable storage medium, the program code configured to, when executed by a computer, cause the computer to:
determine with an artificial intelligence at least one value of a parameter of the controller for at least one state/degree of the first wind energy installation being iced up, on the basis of at least one determined state/degree of the first wind energy installation being iced up, and at least one of:
a power of at least one second wind energy installation, which power is determined for at least one determined state/degree of the at least one second wind energy installation being iced up,
a load of at least one second wind energy installation, which load is determined for the at least one determined state/degree of the at least one second wind energy installation being iced up, or
a downstream flow of at least one second wind energy installation, which downstream flow is determined for the at least one determined state/degree of the at least one second wind energy installation being iced up;
wherein the artificial intelligence determines the at least one value of a parameter of the controller such that a power output of the wind energy installation is maximized.

15. The method of claim 1, wherein the input variable is at least one of a wind speed, a wind direction, a rotational speed, an electrical power of the wind energy installation, or a mechanical power of the wind energy installation.

16. The method of claim 1, wherein the artificial intelligence determines the at least one value of a parameter of the controller for operation without shutting down the wind energy installation.

17. The system of claim 12, wherein the input variable is at least one of a wind speed, a wind direction, a rotational speed, an electrical power of the wind energy installation, or a mechanical power of the wind energy installation.

18. The system of claim 12, wherein the artificial intelligence determines the at least one value of a parameter of the controller for operation without shutting down the wind energy installation.

19. The computer program product of claim 14, wherein the input variable is at least one of a wind speed, a wind direction, a rotational speed, an electrical power of the wind energy installation, or a mechanical power of the wind energy installation.

20. The computer program product of claim 14, wherein the artificial intelligence determines the at least one value of a parameter of the controller for operation without shutting down the wind energy installation.

* * * * *